US007954063B2

(12) United States Patent
Hatscher et al.

(10) Patent No.: US 7,954,063 B2
(45) Date of Patent: May 31, 2011

(54) METHODS AND SYSTEMS FOR ASSIGNING AN ATTRIBUTE VALUE TO AN OBJECT

(75) Inventors: Michael Hatscher, Osnabruck (DE); Joerg Beringer, Frankfurt (DE)

(73) Assignee: SAP AG, Walldorf (DE)

( * ) Notice: Subject to any disclaimer, the term of this patent is extended or adjusted under 35 U.S.C. 154(b) by 607 days.

(21) Appl. No.: 10/846,690

(22) Filed: May 17, 2004

(65) Prior Publication Data
US 2005/0086251 A1 Apr. 21, 2005

(30) Foreign Application Priority Data

May 16, 2003 (EP) .................................... 03011204
Oct. 17, 2003 (EP) .................................... 03078284

(51) Int. Cl.
*G06F 3/00* (2006.01)
(52) U.S. Cl. ........ 715/777; 715/765; 715/771; 707/759; 707/767; 707/771
(58) Field of Classification Search .............. 707/7, 102, 707/3, 706, 707, 708, 728, 748, 759, 767, 707/771; 715/764, 765, 769, 771, 777, 808, 715/809
See application file for complete search history.

(56) References Cited

U.S. PATENT DOCUMENTS

| | | | | |
|---|---|---|---|---|
| 5,546,507 A * | 8/1996 | Staub | ............................. | 706/60 |
| 5,835,094 A * | 11/1998 | Ermel et al. | .................. | 715/848 |
| 5,999,664 A * | 12/1999 | Mahoney et al. | ............. | 382/305 |
| 6,181,342 B1 * | 1/2001 | Niblack | ........................ | 345/635 |
| 6,278,462 B1 * | 8/2001 | Weil et al. | ..................... | 345/619 |
| 6,370,538 B1 * | 4/2002 | Lamping et al. | .............. | 707/102 |
| 6,456,304 B1 * | 9/2002 | Angiulo et al. | ............... | 715/779 |
| 6,473,898 B1 * | 10/2002 | Waugh et al. | ................. | 717/168 |
| 6,480,852 B1 * | 11/2002 | Himmel et al. | ................. | 707/10 |
| 6,549,922 B1 * | 4/2003 | Srivastava et al. | ............ | 707/205 |
| 6,629,104 B1 * | 9/2003 | Parulski et al. | ............... | 707/102 |
| 6,643,639 B2 * | 11/2003 | Biebesheimer et al. | .............. | 1/1 |
| 6,678,867 B2 * | 1/2004 | Fong et al. | ...................... | 715/239 |
| 6,693,651 B2 * | 2/2004 | Biebesheimer et al. | ...... | 715/837 |

(Continued)

FOREIGN PATENT DOCUMENTS

JP 2001-175622 6/2001

(Continued)

OTHER PUBLICATIONS

Notification of Reasons of Rejection in JP Patent Appl. No. 2004-146530, mailed Jun. 4, 2010, 2 pages.

*Primary Examiner* — Ba Huynh
(74) *Attorney, Agent, or Firm* — Finnegan, Henderson, Farabow, Garrett & Dunner, LLP

(57) ABSTRACT

A computer system includes a user interface, which includes a display device for displaying a graphical program interface. The graphical program interface includes one or more controls for assigning at least one attribute value to an attribute of an object. The graphical program interface also includes a current attribute values interface in which attribute values assigned to the object are displayed and an assignable attribute values interface in which a limited set of possible values of at least one of the attributes are shown. At least one of the current attribute values interface and assignable attribute values interface includes a value select control for selecting at least one of the possible values and assigning this selected value to the object attribute.

17 Claims, 2 Drawing Sheets

U.S. PATENT DOCUMENTS

| | | | |
|---|---|---|---|
| 6,701,311 B2 * | 3/2004 | Biebesheimer et al. | 1/1 |
| 6,714,964 B1 * | 3/2004 | Stewart et al. | 709/203 |
| 6,778,193 B2 * | 8/2004 | Biebesheimer et al. | 715/805 |
| 6,795,094 B1 * | 9/2004 | Watanabe et al. | 715/762 |
| 6,820,075 B2 * | 11/2004 | Shanahan et al. | 707/3 |
| 6,826,727 B1 * | 11/2004 | Mohr et al. | 715/517 |
| 6,853,998 B2 * | 2/2005 | Biebesheimer et al. | 1/1 |
| 6,915,301 B2 * | 7/2005 | Hirsch | 707/102 |
| 7,010,751 B2 * | 3/2006 | Shneiderman | 715/764 |
| 7,117,429 B2 * | 10/2006 | Vedullapalli et al. | 715/235 |
| 7,149,729 B2 * | 12/2006 | Kaasten et al. | 707/1 |
| 7,181,445 B2 * | 2/2007 | Bebo et al. | 707/3 |
| 7,191,410 B1 * | 3/2007 | Kruempelmann et al. | 715/853 |
| 7,234,105 B2 * | 6/2007 | Bezrukov et al. | 715/202 |
| 7,272,610 B2 * | 9/2007 | Torres | 707/101 |
| 7,293,014 B2 * | 11/2007 | Subramaniam et al. | 707/3 |
| 2002/0016800 A1 * | 2/2002 | Spivak et al. | 707/523 |
| 2002/0029232 A1 * | 3/2002 | Bobrow et al. | 707/517 |
| 2002/0054059 A1 * | 5/2002 | Schneiderman | 345/700 |
| 2002/0075330 A1 * | 6/2002 | Rosenzweig et al. | 345/854 |
| 2002/0083093 A1 * | 6/2002 | Goodisman et al. | 707/511 |
| 2002/0113821 A1 * | 8/2002 | Hrebejk et al. | 345/764 |
| 2002/0149614 A1 * | 10/2002 | Biebesheimer et al. | 345/738 |
| 2002/0186250 A1 * | 12/2002 | Gardas et al. | 345/783 |
| 2003/0061209 A1 * | 3/2003 | Raboczi et al. | 707/3 |
| 2004/0088313 A1 * | 5/2004 | Torres | 707/101 |
| 2004/0153968 A1 * | 8/2004 | Ching et al. | 715/513 |
| 2004/0172615 A1 * | 9/2004 | Beltran et al. | 717/113 |
| 2004/0177319 A1 * | 9/2004 | Horn | 715/501.1 |
| 2004/0189695 A1 * | 9/2004 | Kurtz et al. | 345/738 |
| 2004/0199491 A1 * | 10/2004 | Bhatt | 707/2 |
| 2004/0230599 A1 * | 11/2004 | Moore et al. | 707/102 |
| 2005/0188174 A1 * | 8/2005 | Guzak et al. | 711/203 |
| 2005/0246352 A1 * | 11/2005 | Moore et al. | 707/100 |
| 2005/0246643 A1 * | 11/2005 | Gusmorino et al. | 715/734 |
| 2005/0251748 A1 * | 11/2005 | Gusmorino et al. | 715/713 |
| 2006/0053158 A1 * | 3/2006 | Hall et al. | 707/102 |
| 2006/0218183 A1 * | 9/2006 | Ivey et al. | 707/104.1 |
| 2008/0052623 A1 * | 2/2008 | Gutfleisch | 715/713 |

FOREIGN PATENT DOCUMENTS

JP     2003-094757     4/2003

* cited by examiner ously. Accordingly, a user can perceive simultane-
METHODS AND SYSTEMS FOR ASSIGNING AN ATTRIBUTE VALUE TO AN OBJECT This application is based upon and claims the benefit of priority from prior patent application EP 03011204.9, filed May 16, 2003, and prior patent application EP 03078284.1, filed Oct. 17, 2003, the entire contents of each which are expressly incorporated herein by reference.

BACKGROUND

I. Technical Field

The present invention relates to methods and systems for assigning an attribute value to an object in a computer system.

II. Background Information

Computer systems, when running a computer program, typically include a user interface through which a user can assign attribute values to attributes of an object. For example, the object may be an item in a database to which keywords can be assigned that are helpful when searching in the database. In such a system, an object identification (such as a name) is presented in a graphical program interface of the running program. The graphical program interface has a control via which the user can activate a pop-up menu to assign suitable attribute values to the object. The pop-up menu is a second program interface provided with controls via which the user can assign the values to the object in the program interface of the running program.

However, in such a system, the pop-up menu prohibits the user from accessing the running program via the graphical program interface. When assigning the values, the user may want to see what values are already assigned to the attributes of the object. To do so, however, the pop-up menu must be closed. Furthermore, the pop-up menu can obscure parts of the graphical interface of the running program and may for example obscure the object identification. Such a system is inconvenient to the user. In view of the foregoing, there is a need for methods and systems for more efficiently assigning an attribute value in a computer system.

SUMMARY

A computer system is easier to use because the graphical user interface includes a current attribute values interface in which attribute values assigned to an object are shown and an assignable attribute values interface in which a limited vocabulary of possible values for at least one of the attributes are shown. Accordingly, a user can perceive simultaneously both the information about the attribute values already assigned and the possible additional values that may be assigned. In addition, the current attribute value interface and the assignable attribute value interface are part of the graphical program interface. Use of the graphical program interface of the running program while the attribute value interfaces are open is therefore not inhibited. Also, the current attribute value interface and/or the assignable attribute value interface are part of the graphical program interface and, using a suitable design of the graphical program interface, parts of the graphical program interface are not obscured.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
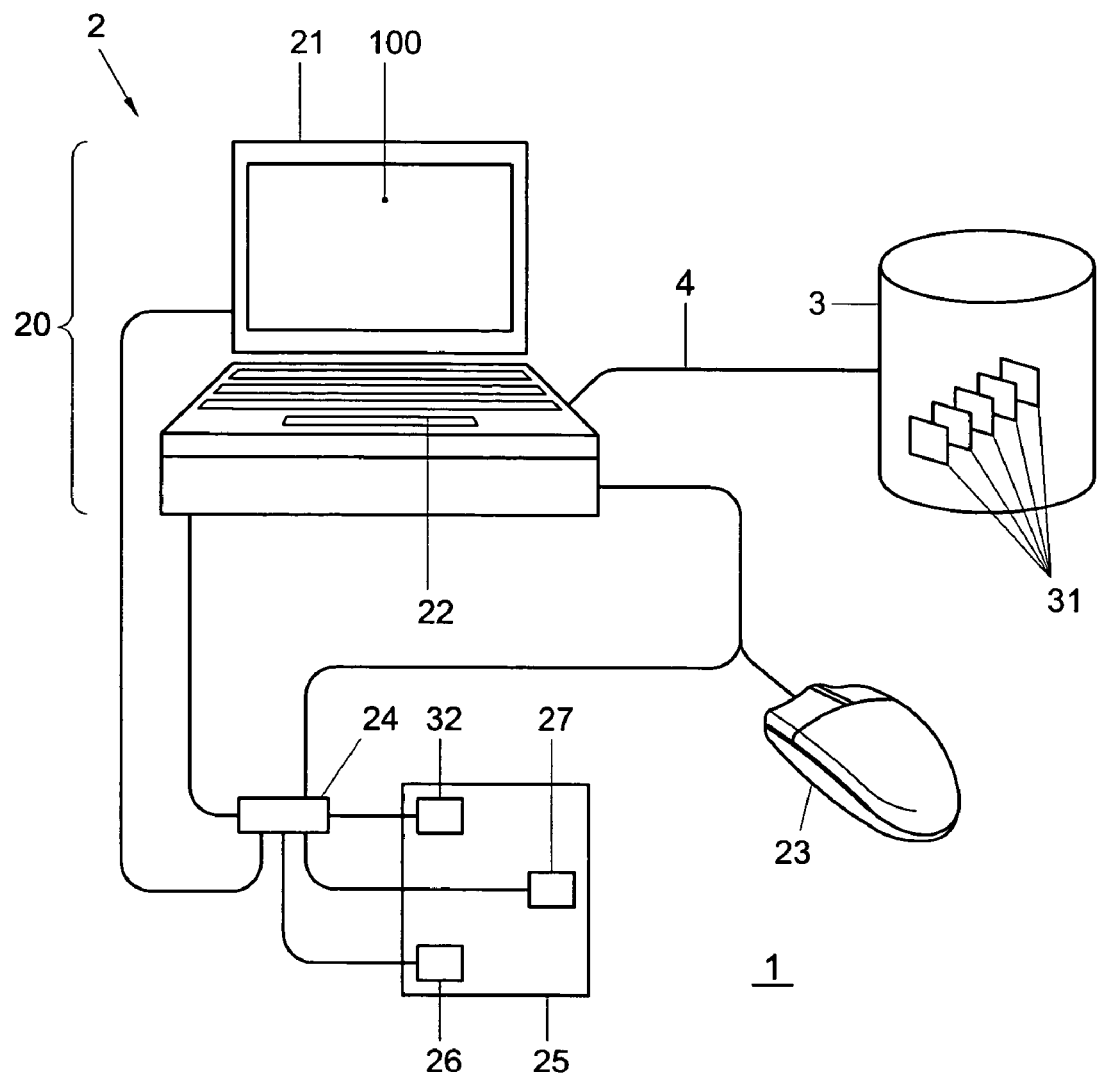
FIG. 1 shows an example of an embodiment of a computer system according to the invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

In FIG. 1, a computer system 1 includes computer device 2 and database 3. In database 3, objects 31 are stored. Objects 31 may be documents in a knowledge base that include information describing how to accomplish certain tasks. Also, objects 31 may include information about persons working in a company or other identification information. As shown in FIG. 1, database 3 is located outside of computer device 2 and a database connection 4 is provided to communicatively connect database 3 to computer device 2. Database 3 may alternatively be positioned inside computer device 2.

Figure 2:
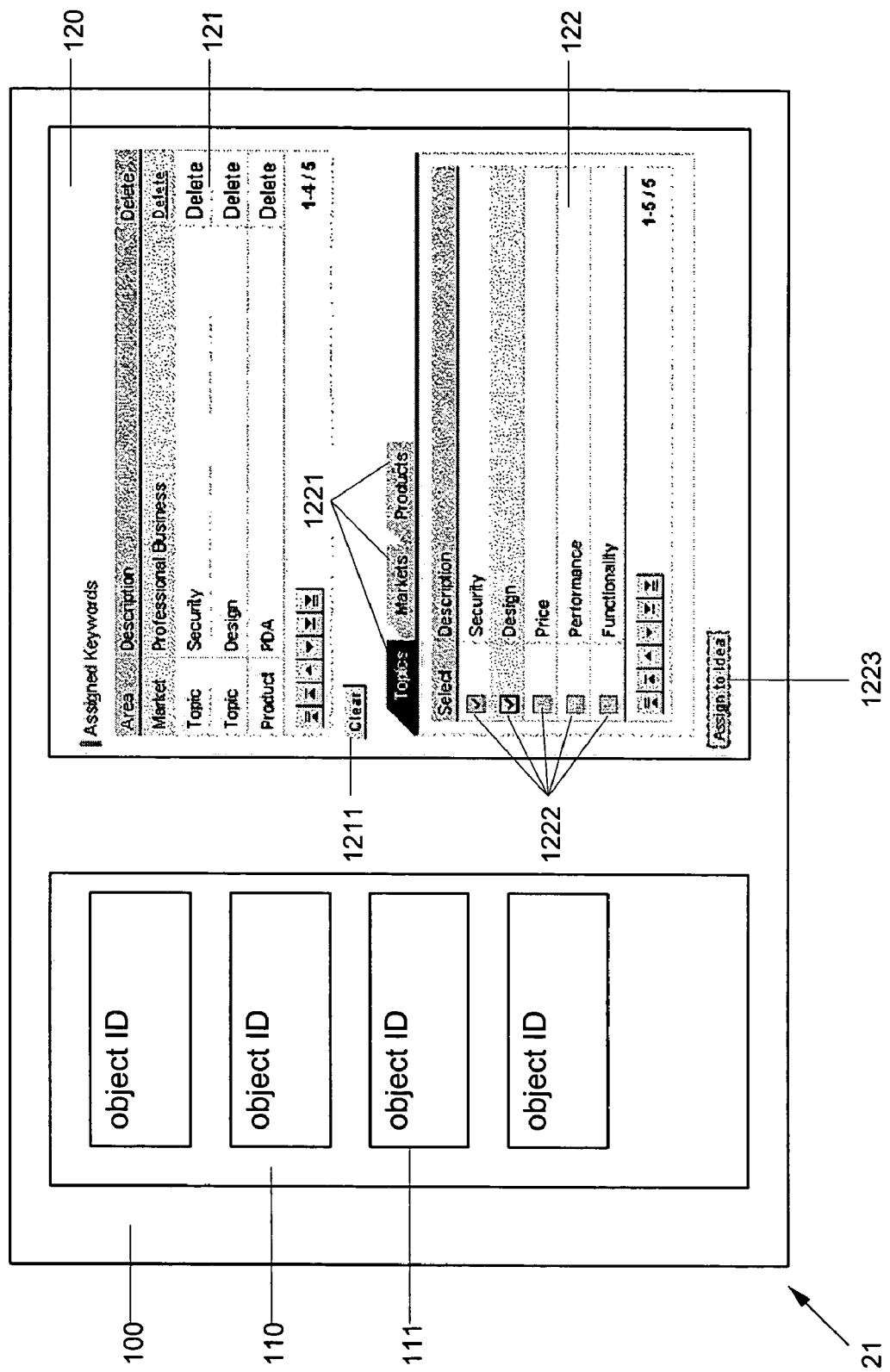
FIG. 2 shows an example of an embodiment of a user interface suitable for use in the example of FIG. 1.

As shown in FIGS. 1 and 2, computer device 2 is provided with a user interface (UI) 20, which in this example includes an output interface, such as display 21. Display 21 may display information referred to as a graphical user interface (GUI) 100. Data can be outputted in a perceivable form at the output interface. In this example, the data can be outputted visually. The user interface 20 further includes an input interface, such as a keyboard 22 and a mouse 23 through which a user can input data into computer device 2.

Both the output interface and the input interface may include other components than those depicted in FIG. 1, such as an electronic writing pad, acoustic output or input devices. Furthermore, the input and output interface may at least partially be integrated in the same device, such as in a touch screen.

In the example computer system shown in FIG. 1, actions performed by a user by means of keyboard 22 and mouse 23 are graphically represented on display 21 by computer device 2. In this example, when actions are performed by a user at the GUI, the actions are performed by means of keyboard 22 and mouse 23, but are graphically represented on the GUI. However, it is also possible to combine the GUI and the input interface, for example, as a touch-screen. In a combined GUI and input interface, actions performed by a user at the GUI are both represented and performed at the GUI.

Computer device 2 also includes a processor 24 that is communicatively connected to display 21, keyboard 22, mouse 23, and a memory 25, as indicated by the lines shown in FIG. 1. Processor 24 is, among other things, arranged to handle input from the input interface, and to provide display 21 with outputted data. Processor 24 may be arranged to perform other operations as well, such as routing data received or outputted to other devices, or otherwise manipulating data.

A computer program may be executing on computer device 2. For example, the computer program may be a program for storing, categorizing and/or ordering items in database 3 or may, for example, be a web-browser program that allows access to resources, such as applications, data and services of a computerized enterprise management system, such as systems provided by SAP AG of Walldorf, Germany.

When the computer program is run on computer system 1, processor 24 performs instructions according to program code stored in memory 25. As shown in FIG. 2, graphical program interface 100 is visually outputted onto display 21 when the computer program is running. Graphical program interface 100 is a graphical representation of a part of the computer program running on computer device 2.

In the example shown in FIG. 2, graphical program interface 100 includes object listing interface 110 in which names, such as the object ID, of one or more of objects 31 present in database 3 are listed in, for example, object ID field 111. For example, objects 31 may include files stored electronically in database 3 and the object ID may be the name of a file. Referring to FIG. 1, the object listing may be retrieved by processor 24 from an index 32 of database 3. In this example, index 32 is stored in memory 25 and can be displayed in graphical program interface 100.

Returning to FIG. 2, object listing interface 110 is provided with "select" controls through which a user can select object ID field 111. The select controls may be integrated in object ID fields 111 as hyperlinks. In such a case, a user can retrieve the document corresponding to the object ID from the database by clicking on a hyperlink.

Graphical program interface 100 further includes an attribute interface 120. Attribute interface 120 includes current attribute values interface 121 and an assignable attribute values interface 122. Current attribute values interface 121 displays the values of the attributes assigned to one or more of objects 31. Assignable attribute value interface 122 displays possible values that can be given to attributes of an object.

In this example, processor 24 receives an activation signal when the user selects one or more object ID fields in object listing interface 110. Processor 24 retrieves an attribute list 26 from memory 25 in response to an activation signal. Attribute list 26 includes attributes of objects 31 corresponding to selected object ID fields. Processor 24 also retrieves from memory 25 one or more value lists 27 that contain possible values for the different attributes. Processor 24 outputs the different attributes and possible values in assignable attribute value interface 122. Processor 24 further determines the current attribute values of the objects corresponding to the selected object ID fields and outputs the current or assigned attribute values in current attribute values interface 121.

As shown in FIG. 2, attributes displayed in attribute value interfaces 121 and 122 may be different aspects of a text document that is stored in database 3 and corresponds to an object ID. The attribute values may be keywords that can be used to describe the different aspects of the text document. In FIG. 2, assigned keywords for different aspects of the text document are shown in current attribute values interface 121. In this example, the aspects of the document are categories to which the document relates, such as a professional business; the topic of the text, such as security and design; and the product that the text relates to, such as a personal digital assistant.

The object attributes may already be provided with values, or values of the object attributes may not have been set. In the latter case, a value may be set automatically by processor 24 when retrieving the object listing. For example, keywords may initially be assigned automatically to a given text document through a retrieval and classification engine, such as the engine named TREX by SAP AG of Walldorf, Germany. The user may refine those initial system proposals using a limited vocabulary of assignable keywords that is shown in assignable attribute value interface 122.

Assignable attribute values interface 122 includes controls through which a value can be assigned to one or more attributes of the selected object. In the example shown in FIG. 2, assignable attribute values interface 122 is provided with attribute type select controls 1221 through which a user can select a certain type of attribute. In response to the selection of an attribute type, the values of the selected attribute type that can be assigned to the object are shown in a field in assignable attribute values interface 122. By selecting a desired attribute type, the user can be presented with only values that are related to the attribute type and that make sense to be assigned to this object. The processor checks the object against the possible values and filters the values that do not make sense in this context.

For example in FIG. 2, one may select a topics attribute included in attribute type select controls 1221. The values for the topics attribute are shown in assignable attribute values interface 122. These values are security, design, price, performance, and functionality. A user can select one or more of the possible values via value select controls 1222 and may assign the values to the selected object via value assign control 1223.

Current attribute values interface 121 is further provided with value clear control 1211. Using value clear control 1211, a user can clear the current values of a selected attribute. For example in FIG. 2, one may select the market attribute and then clear the assigned values via clear control 1211. Once a value is assigned to an attribute of an object or the value is cleared, the result is stored in the computer system in object fields in database 3, for example.

A computer system according to the invention is especially suited, for example, for selecting values out of a set of controlled categories that are more or less flat or grouped lists but not deep hierarchies, because such categories can be shown in a non-complex arrangement, as shown in FIG. 2. In the interface of FIG. 2, values for different attributes, such as keywords or topics from different sub-vocabularies can be inspected and selected while maintaining an overview of the selected items. Furthermore, attribute interface 120 provides immediate feedback to a user about the current set of selected attribute values.

The computational aspects described here can be implemented in digital electronic circuitry, or in computer hardware, firmware, software, or in combinations of them. Where appropriate, aspects of these systems and techniques can be implemented in a computer program product tangibly embodied in a machine-readable storage device for execution by a programmable processor, and method steps can be performed by a programmable processor executing a program of instructions to perform functions by operating on input data and generating output.

The invention may also be implemented in an article of manufacture with a computer usable medium having computer readable instructions embodied therein for providing access to resources available on that computer, the computer readable instructions comprising instructions to cause the computer to perform the steps of a method according to the invention. The invention may also be implemented as a computer program for running on a computer system, at least including code portions for performing steps of a method according to the invention when run on a computer system or enabling a general-propose computer system to perform functions of a filter device according to the invention. Such a computer program may be provided on a data carrier, such as a CD-ROM or diskette, stored with data loadable in a memory of a computer system, the data representing the computer program. The data carrier may further be a data connection, such as a telephone cable or a wireless connection transmitting signals representing a computer program according to the invention.

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A method for assigning values to attributes of documents in a computer system, comprising:
   displaying, to a user on a display device, one or more document identifiers, wherein each document identifier includes a hyperlink associated with a corresponding document stored in a database;
   receiving, from the user, a selection of a document stored in the database, wherein the user selection comprises a selection of the hyperlink associated with the document;
   retrieving, from the database, an attribute list associated with the selected document and a list of values corresponding to the attribute list, the attribute list comprising one or more attributes assigned to the selected document;
   displaying, in a first interface of the display device, the attributes assigned to the selected document and a set of attribute values currently assigned to each of the displayed attributes;
   receiving, from the user, a selection of at least one of the displayed attributes;
   displaying the selected attribute in a highlighted portion of the first interface, in response to the received selection;
   processing the list of values of identify values associated with the selected attribute, the identified values comprising (i) values currently assigned to the selected attribute and (ii) possible values that can be assigned to the selected attribute, wherein the processing step comprises:
      filtering the possible values according to at least one of a property of the selected attribute or a property of the selected document;
   displaying, in a second interface of the display device, the filtered possible values and the values currently assigned to the selected attribute, wherein:
      the selected attribute is displayed in a highlighted portion of the second interface; and
      the values currently assigned to the selected attribute and the filtered possible values that can be assigned to the selected attribute are displayed simultaneously in the second interface;
   receiving, from the user, a selection of at least one of the filtered possible values displayed in the second interface;
   modifying the set of values currently assigned to the selected attribute in response to the received selection, the modifying comprising:
      assigning the at least one selected value to the selected attribute, when the at least one selected value is one of the filtered possible values; and
      storing the at least one selected value in the document in the database; and
   displaying the modified set of values associated with the selected attribute in the first interface of the display device.

2. The method of claim 1, wherein:
   the selected document is a text document;
   the attributes of the selected document are aspects of the text document; and
   the attribute values are keywords for describing the aspects of the text document.

3. The method of claim 1, further comprising in response to the selection of the document, assigning at least one filtered possible value to an attribute of the selected document using a search and retrieval engine.

4. The method of claim 1, wherein:
   displaying the filtered possible values and the values currently assigned to the selected attribute in the second interface of the display device further comprises:
      displaying first status indicators corresponding to the values currently assigned to the selected attribute and second status indicators corresponding to the filtered possible values of the selected attribute; and
   modifying the set of values currently assigned to the selected attribute further comprises:
      replacing the second status indicator associated with the selected value with a corresponding first status indicator.

5. A tangible computer-readable storage device, comprising program code to run on a programmable apparatus for performing steps of a method comprising:
   displaying, to a user on a display device, one or more document identifiers, wherein each document identifier includes a hyperlink associated with a corresponding document stored in a database;
   receiving, from the user, a selection of a document stored in the database, wherein the user selection comprises a selection of the hyperlink associated with the document;
   retrieving, from the database, an attribute list associated with the selected document and a list of values corresponding to the attribute list, the attribute list comprising one or more attributes assigned to the selected document;

displaying, in a first interface of the display device, the
attributes assigned to the selected document and a set of
attribute values currently assigned to each of the displayed attributes;

receiving, from the user, a selection of at least one of the displayed attributes;

displaying the selected attribute in a highlighted portion of the first interface, in response to the received selection;

processing the list of values of identify values associated with the selected attribute, the identified values comprising (i) values currently assigned to the selected attribute and (ii) possible values that can be assigned to the selected attribute, wherein the processing step comprises:

filtering the possible values according to at least one of a property of the selected attribute or a property of the selected document;

displaying, in a second interface of the display device, the filtered possible values and the values currently assigned to the selected attribute, wherein:

the selected attribute is displayed in a highlighted portion of the second interface; and the values currently assigned to the selected attribute and the filtered possible values that can be assigned to the selected attribute are displayed simultaneously in the second interface;

receiving, from the user, a selection of at least one of the filtered possible values displayed in the second interface;

modifying the set of values currently assigned to the selected attribute in response to the received selection, the modifying comprising:

assigning the at least one selected value to the selected attribute, when the at least one selected value is one of the filtered possible values; and storing the at least one selected value in the document in the database; and displaying the modified set of values associated with the selected attribute in the first interface of the display device.

6. The computer-readable storage device of claim 5, wherein:

the selected document is a text document;

the attributes of the selected document are aspects of the text document; and the attribute values are keywords for describing the aspects of the text document.

7. The computer-readable storage device of claim 5, wherein the method further comprises in response to the selection of the document, assigning at least one filtered possible value to an attribute of the selected document using a search and retrieval engine.

8. The computer-readable storage device of claim 5, wherein:

displaying the filtered possible values and the values currently assigned to the selected attribute in the second interface of the display device further comprises:

displaying first status indicators corresponding to the values currently assigned to the selected attribute and second status indicators corresponding to the filtered possible values of the selected attribute; and modifying the set of values currently assigned to the selected attribute further comprises:

replacing the second status indicator associated with the selected value with a corresponding first status indicator.

9. An article of manufacture with a tangible computer-usable medium having computer-readable instructions embodied therein for providing access to resources available on a computer, the computer-readable instructions comprising instructions to cause the computer to perform the steps of a method comprising:

displaying, to a user on a display device, one or more document identifiers, wherein each document identifier includes a hyperlink associated with a corresponding document stored in a database;

receiving, from the user, a selection of a document stored in the database, wherein the user selection comprises a selection of the hyperlink associated with the document;

retrieving, from the database, an attribute list associated with the selected object document and a list of values corresponding to the attribute list, the attribute list comprising one or more attributes assigned to the selected document;

displaying, in a first interface of the display device, the attributes assigned to the selected document and a set of attribute values currently assigned to each of the displayed attributes;

receiving, from the user, a selection of at least one of the displayed attributes;

displaying the selected attribute in a highlighted portion of the first interface, in response to the received selection;

processing the list of values of identify values associated with the selected attribute, the identified values comprising (i) values currently assigned to the selected attribute and (ii) possible values that can be assigned to the selected attribute, wherein the processing step comprises:

filtering the possible values according to at least one of a property of the selected attribute or a property of the selected document;

displaying, in a second interlace of the display device, the filtered possible values and the values currently assigned to the selected attribute, wherein:

the selected attribute is displayed in a highlighted portion of the second interface; and the values currently assigned to the selected attribute and the filtered possible values that can be assigned to the selected attribute are displayed simultaneously in the second interface;

receiving, from the user, a selection of at least one of the filtered possible values displayed in the second interlace;

modifying the set of values currently assigned to the selected attribute in response to the received selection, the modifying comprising:

assigning the at least one selected value to the selected attribute, when the at least one selected value is one of the filtered possible values; and storing the at least one selected value in the document in the database; and displaying the modified set of values associated with the selected attribute in the first interlace of the display device.

10. The article of manufacture of claim 9, wherein:

the selected document is a text document;

the attributes of the selected document are aspects of the text document; and the attribute values are keywords for describing the aspects of the text document.

11. The article of manufacture of claim 9, wherein the method further comprises in response to the selection of the document, assigning at least one filtered possible value to an attribute of the selected document using a search and retrieval engine.

12. The article of manufacture of claim 9, wherein:
displaying the filtered possible values and the values currently assigned to the selected attribute in the second interface of the display device further comprises:
displaying first status indicators corresponding to the values currently assigned to the selected attribute and second status indicators corresponding to the filtered possible values of the selected attribute; and
modifying the set of values currently assigned to the selected attribute further comprises:
replacing the second status indicator associated with the selected value with a corresponding first status indicator.

13. A computer device including a processor, memory, and a display device for displaying a graphical program interface, the graphical program interface comprising:
a document listing interface for receiving, from a user, a selection of a document stored in a database, the object listing interface displaying to the user one or more identifiers of documents in the database, wherein each identifier includes a hyperlink associated with a corresponding document in the database, and further wherein the user selects the document in the database by selecting the hyperlink associated with the document,
wherein the document listing interface is configured to:
retrieve, from the database, an attribute list associated with the selected document and a list of values corresponding to the attribute list, the attribute list comprising one or more attributes assigned to the selected document;
process the retrieved list of values to identify values currently assigned to the one or more attributes of the attribute list, and to identify possible values that can be assigned to the one or more attributes of the attribute list;
a current attribute values interface for displaying the attributes assigned to the selected documents and the current values of the attributes assigned to the selected document; and
an assignable attribute values interface comprising:
an attribute select control for receiving, from the user, a selection of one of the displayed attributes;
a field highlighting the selected attribute;
a field displaying (i) current values assigned to the selected attribute and (ii) a filtered set of possible attribute values associated with the selected attribute simultaneously, wherein:
the object listing interlace is further configured to filter the set of possible values associated with the selected attribute, based on a context associated with the selected object, to generate the filtered set;
an attribute value select control for receiving, from the user, a selection of a filtered possible value from the displayed set; and
an assign control for assigning the selected value to the selected attribute,
wherein, upon assignment:
the assigned value is stored in the selected document in the database; and
the current attribute values interface is updated to display the assigned value and the selected attribute.

14. The computer device of claim 13, wherein the attribute select control displays only values that are assignable to the selected attribute.

15. The computer device of claim 13, wherein the current attribute values interface comprises a value clear control for clearing each current attribute value assigned to the selected object.

16. The computer device of claim 13, wherein:
the selected document is a text document;
the attributes of the selected document are aspects of the text document; and
the attribute values are keywords for describing the aspects of the text document.

17. The computer device of claim 13, wherein:
the assignable attribute values interface further comprises a field displaying first status indicators corresponding to the values currently assigned to the selected attribute and second status indicators corresponding to the filtered possible values of the elected attribute; and
upon assignment, the second status indicator corresponding to the selected value is replaced with a first status indicator.

* * * * *